US006337856B1

(12) United States Patent
Schanhals et al.

(10) Patent No.: US 6,337,856 B1
(45) Date of Patent: Jan. 8, 2002

(54) MULTIMEDIA DATA COMMUNICATIONS SYSTEM

(75) Inventors: Jeffrey Alan Schanhals, Kentwood; Christopher Carl Steffes, Portland; Anthony Tonizzo, Kentwood; George William Vallillee, IV, Grand Rapids, all of MI (US)

(73) Assignees: Steelcase Development Corporation, Caledonia; Datalogic Corporation, Grand Rapids, both of MI (US)

( * ) Notice: Subject to any disclaimer, the term of this patent is extended or adjusted under 35 U.S.C. 154(b) by 0 days.

(21) Appl. No.: 09/082,255

(22) Filed: May 20, 1998

(51) Int. Cl.$^7$ .............................................. H04L 12/66
(52) U.S. Cl. ...................... 370/352; 370/353; 370/354; 370/355
(58) Field of Search ................................ 370/352, 353, 370/354, 355, 356, 464, 466, 467, 487, 493, 494

(56) References Cited

U.S. PATENT DOCUMENTS

| 3,330,955 A | 7/1967 | Barecki et al. .............. 250/199 |
| 3,705,986 A | 12/1972 | Sanders et al. .............. 250/199 |

(List continued on next page.)

FOREIGN PATENT DOCUMENTS

| DE | 3223831 A1 | 2/1983 |
| EP | 0 192 894 | 3/1986 |
| EP | 724 227 A2 | 7/1996 |
| GB | 2079088 A | 1/1982 |
| GB | 2 296 622 A | 12/1995 |
| GB | 2 296 584 A | 7/1996 |
| JP | 58-114639 A | 7/1983 |
| JP | 60-7232 A | 1/1985 |

(List continued on next page.)

OTHER PUBLICATIONS

"PLX 1000" Parallax Research (printed from Internet on May 9, 1997).

(List continued on next page.)

*Primary Examiner*—Wellington Chin
*Assistant Examiner*—Brenda H. Pham
(74) *Attorney, Agent, or Firm*—Foley & Lardner (57) ABSTRACT

A method and apparatus is disclosed for a multimedia data communications system. The data communication system is provided for use in a work environment to establish a connection between a data communication device and an access point in connection with a communication system and with a multimedia system providing a multimedia signal. The data communication system includes a data port associated with the access point, a multimedia conversion circuit associated with the access point and in communication with the data port for converting the multimedia signal from the multimedia system into a multimedia data signal for transmission to the data communication device and for converting a multimedia data signal from the data communication device for transmission to the multimedia device, and a device port associated with the data communication device so that a data link can be established between the data port and the device port. The data communication system also includes a processor associated with the access point for formatting data communications between both the communication system and the data communication device and the multimedia device and the data communication device for transmission over the data link. A method is disclosed for transmitting a signal having a multimedia component and a data component across a data link between a data communication device having a device port and a network access point having a network port. The method includes the steps of determining whether the signal includes a multimedia component, queuing the signal for transmission across the data link so that the multimedia component of the signal is given a higher priority for transmission than the data component of the signal, and transmitting the signal across the data link.

41 Claims, 9 Drawing Sheets

U.S. PATENT DOCUMENTS

| | | | |
|---|---|---|---|
| 4,275,385 A | 6/1981 | White | 340/312 |
| 4,402,090 A | 8/1983 | Gfeller et al. | 455/601 |
| 4,408,543 A | 10/1983 | Griffin | 108/24 |
| 4,426,738 A | 1/1984 | Sato | 455/603 |
| 4,450,319 A | 5/1984 | Lucey | 179/2 EA |
| 4,456,793 A | 6/1984 | Baker et al. | 179/99 |
| 4,516,221 A | 5/1985 | Nakata | 364/900 |
| 4,601,064 A | 7/1986 | Shipley | 455/608 |
| 4,628,541 A | 12/1986 | Beavers | 455/603 |
| 4,649,385 A | 3/1987 | Aires et al. | 379/57 |
| 4,659,048 A | 4/1987 | Fahrion | 248/285 |
| 4,717,913 A | 1/1988 | Elger | 349/825.54 |
| 4,727,600 A | 2/1988 | Avakian | 455/601 |
| 4,807,222 A | 2/1989 | Amitay | 370/85 |
| 4,809,257 A | 2/1989 | Gantenbein et al. | 370/4 |
| 4,837,568 A | 6/1989 | Snaper | 340/825.54 |
| 4,843,606 A | 6/1989 | Bux et al. | 370/89 |
| 4,856,046 A | 8/1989 | Streck et al. | 379/56 |
| 4,866,704 A | 9/1989 | Bergman | 370/85.4 |
| 4,866,758 A | 9/1989 | Heinzelmann | 379/94 |
| 4,932,050 A | 6/1990 | Davidson et al. | 379/211 |
| 4,959,874 A | 9/1990 | Saruta et al. | 455/601 |
| 4,975,926 A | 12/1990 | Knapp | 375/1 |
| 4,977,618 A | 12/1990 | Allen | 455/607 |
| 5,062,151 A | 10/1991 | Shipley | 359/154 |
| 5,068,916 A | 11/1991 | Harrison et al. | 455/39 |
| 5,087,982 A | 2/1992 | Smothers | 359/137 |
| 5,099,346 A | 3/1992 | Lee et al. | 359/118 |
| 5,191,461 A | 3/1993 | Cranshaw et al. | 359/154 |
| 5,218,356 A | 6/1993 | Knapp | 342/350 |
| 5,235,258 A | 8/1993 | Schuerch | 318/16 |
| 5,241,410 A | 8/1993 | Streck et al. | 359/176 |
| 5,247,380 A | 9/1993 | Lee et al. | 359/118 |
| 5,253,095 A | 10/1993 | Menadier et al. | 359/174 |
| 5,276,680 A | 1/1994 | Messenger | 370/85.1 |
| 5,276,703 A | 1/1994 | Budin et al. | 375/1 |
| 5,283,819 A | 2/1994 | Glick et al. | 379/90 |
| 5,297,144 A | 3/1994 | Gilbert et al. | 370/95.2 |
| 5,305,132 A | 4/1994 | Fasen et al. | 359/113 |
| 5,307,297 A | 4/1994 | Iguchi et al. | 364/708.1 |
| 5,309,351 A | 5/1994 | McCain et al. | 364/132 |
| 5,321,542 A | 6/1994 | Freitas et al. | 359/172 |
| 5,341,374 A | 8/1994 | Lewen et al. | |
| 5,363,229 A | 11/1994 | Sakurai et al. | 359/159 |
| 5,363,425 A | 11/1994 | Mufti et al. | 379/38 |
| 5,369,686 A | 11/1994 | Dutra et al. | 379/94 |
| 5,384,652 A | 1/1995 | Allen et al. | 359/172 |
| 5,387,993 A | 2/1995 | Heller et al. | 359/155 |
| 5,387,994 A | 2/1995 | McCormack et al. | 359/159 |
| 5,398,280 A | 3/1995 | MacConnell | 379/93 |
| 5,400,246 A | 3/1995 | Wilson et al. | 364/146 |
| 5,402,469 A | 3/1995 | Hopper et al. | 379/93 |
| D358,380 S | 5/1995 | Sakaguchi | D14/114 |
| 5,416,627 A | 5/1995 | Wilmoth | 359/159 |
| 5,424,859 A | 6/1995 | Uehara et al. | 359/152 |
| 5,438,937 A | 8/1995 | Ball et al. | 108/64 |
| 5,440,559 A | 8/1995 | Gaskill | 370/95.1 |
| RE35,035 E | 9/1995 | Shipley | 359/154 |
| 5,455,851 A | 10/1995 | Chaco et al. | 379/38 |
| 5,457,742 A | 10/1995 | Vallillee et al. | 379/352 |
| 5,461,627 A | 10/1995 | Rypinski | 370/95.2 |
| 5,463,623 A | 10/1995 | Grimes et al. | 370/79 |
| 5,479,408 A | 12/1995 | Will | 370/94.1 |
| 5,493,283 A | 2/1996 | Hopper et al. | 340/825.34 |
| 5,508,836 A | 4/1996 | DeCaro et al. | 359/189 |
| 5,515,426 A | 5/1996 | Yacenda et al. | 379/201 |
| 5,526,351 A | 6/1996 | Mochinaga et al. | 370/60.1 |
| 5,539,665 A | 7/1996 | Lamming et al. | 364/514 R |
| 5,548,637 A | 8/1996 | Heller et al. | 379/201 |
| 5,550,913 A | 8/1996 | McMaster et al. | 379/230 |
| 5,564,020 A | 10/1996 | Rossi | 395/200.15 |
| 5,564,070 A | 10/1996 | Want et al. | 455/53.1 |
| 5,566,022 A | 10/1996 | Segev | 359/172 |
| 5,568,544 A | 10/1996 | Keeler et al. | 379/273 |
| 5,596,648 A | 1/1997 | Fast | 381/77 |
| 5,600,471 A | 2/1997 | Hirohashi et al. | 359/152 |
| 5,602,843 A | 2/1997 | Gray | 370/338 |
| 5,606,444 A | 2/1997 | Johnson et al. | 359/152 |
| 5,617,236 A | 4/1997 | Wang et al. | 359/172 |
| 5,627,524 A | 5/1997 | Frederickson et al. | 340/825.07 |
| 5,640,390 A | 6/1997 | Sakamoto et al. | 370/346 |
| 5,646,761 A | 7/1997 | Medved et al. | 359/172 |
| 5,681,008 A | 10/1997 | Kinstler | 244/3.11 |
| 5,742,596 A | 4/1998 | Baratz et al. | 370/356 |
| 6,173,044 B1 * | 1/2001 | Hortensius et al. | 379/93.09 |
| 6,199,076 B1 * | 3/2001 | Logan et al. | 707/501 |

FOREIGN PATENT DOCUMENTS

| | | |
|---|---|---|
| JP | 60-180230 A | 9/1985 |
| JP | 62-14539 A | 1/1987 |
| JP | 62-14540 A | 1/1987 |
| JP | 2-87836 A | 3/1990 |
| JP | 3-274837 A | 12/1991 |
| WO | WO 93/21581 | 10/1993 |

OTHER PUBLICATIONS

"HP Creates a Simple, Reliable Way to Connect Portable PC's to a LAN" Hewlett Packard (printed from Internet on May 9, 1997).

"Wireless File Transfer Between Notebook and Desktop PCs" TekrAm (printed from Internet on May 9, 1997).

"Products Overview" Parallax Research (printed from Internet on May 9, 1997).

"Viper IRDA Infrared Adapter for PC Motherboard" Parallax Research (printed from Internet on May 9, 1997).

"Desk Top Computing" Hewlett Packard (printed from Internet on May 9, 1997).

"ACTiSYS" (printed from Internet on May 9, 1997).

"Making Network Access Easy for Portable PC Users" Hewlett Packard (printed from Internet on May 9, 1997).

"HP Netbeamir Infrared Access Point—Product Specifications" Hewlett Packard (printed from Internet on May 9, 1997).

Proceedings of the IEEE; Nov., 1979; Gfeller et al.; Wireless In–House Data Communication Via Diffuse Infrared Radiation.

IEEE; 1978; Gfeller et al.; Infrared Communication For In–House Applications.

IBM Technical Disclosure Bulletin; Feb., 1986; Gfeller et al.; Asynchronous Communication Link For Infrared Transmission.

IBM Technical Disclosure Bulletin; Jan., 1983; Gfeller; Minicomputer System Components Interconnected Via A Serial Infrared Link.

IBM Technical Disclosure Bulletin; Feb., 1986; Touchpad Cable Function.

IBM Tecnical Disclosure Bulletin; Mar., 1986; Group Encoding Method for Infrared Communication.

"Wireless Infrared Connections for Portable Computer Users" JetEye Infrared Products.

"Infranet: Infrared Microbroadcasting Network for In–House Data Communication".

HP Press Release; "HP to Support New 4MBPS Infrared Networking Product" (printed from Internet on May 9, 1997).

* cited by examiner

MULTIMEDIA DATA COMMUNICATIONS SYSTEM

FIELD OF THE INVENTION

The present invention relates to a multimedia data communications system. In particular, the present invention relates to a data communications system wherein a multimedia signal from a multimedia device is converted into a format suitable for transmission to a data communications device across a data link. More specifically, the present invention relates to a data communications system including a multimedia conversion circuit wherein a multimedia signal from a multimedia device is converted into a format suitable for transmission to a data communications device across an infrared data link.

BACKGROUND OF THE INVENTION

It is known to provide in a work environment such as an office for the essentially parallel co-existence of a computer network, by which various computing devices, servers and peripheral devices and their associated office workers (or other users) may communicate and share information, and a telephone network, consisting of a central telephone switch connected to an external telephone provider and an internal telephone system having telephone extensions by which associated office workers may communicate and share information. This requires the office worker to have access both to a computing device and to a telephone device if information is to be communicated and shared over both the computer network and the telephone network. It is also known to provide in a work environment or the like for the use of various other "multimedia devices" (not associated with the computer network), such as audio and video equipment, intercom systems, etc. by which office workers may communicate and share information. This requires that the office worker also have access to a separate device capable of accessing a multimedia signal from the multimedia device (e.g. audio player, video player, television, etc.) in order to communicate and share such information.

However, none of the foregoing known systems provide for an "integrated" solution wherein office workers (or other persons in a work environment or the like) are able to communicate and share information both from the computer network and from the telephone network and/or from other multimedia devices only by having access to a computing device.

Accordingly, it would be advantageous to have a multimedia data communication system configured for an office worker or the like in a work environment or the like so that information from the telephone network and/or other multimedia devices can be shared and received at a data communication device (such as a computing device) associated with the office worker, along with the other information typically communicated and shared on a conventional computer network (or other communication system). It would also be advantageous to have a multimedia data communication system configured to provide for data communications of both a conventional data signal from the computer network and a multimedia data signal derived from the multimedia device through a network access point connected both to the computer network and to the multimedia device.

SUMMARY OF THE INVENTION

The present invention relates to a data communications system for use in a work environment to establish a connection between a data communication device and an access point in connection with a communication system and with a multimedia system providing a multimedia signal. The data communication system includes a data port associated with the access point, a multimedia conversion circuit associated with the access point and in communication with the data port for converting the multimedia signal from the multimedia system into a multimedia data signal for transmission to the data communication device and for converting a multimedia data signal from the data communication device for transmission to the multimedia device, and a device port associated with the data communication device so that a data link can be established between the data port and the device port. The data communication system also includes a processor associated with the access point for formatting data communications between both the communication system and the data communication device and the multimedia device and the data communication device for transmission over the data link.

The present invention also relates to a method of transmitting a signal having a multimedia component and a data component across a data link between a data communication device having a device port and a network access point having a network port. The method includes the steps of determining whether the signal includes a multimedia component, queuing the signal for transmission across the data link so that the multimedia component of the signal is given a higher priority for transmission than the data component of the signal, and transmitting the signal across the data link.

The present invention further relates to a method of transmitting a signal having a multimedia component and a data component in data packets for transmission across a data link between a data communication device having a device port and an access point having a network port. The method includes the steps are: assembling the multimedia component of the signal in a first set of data packets, assembling the data component of the signal in a second set of data packets, creating a transmit queue wherein the first set of data packets is given a higher priority than the second set of data packets, and transmitting the first set of data packets from the transmit queue across the data link before the second set of data packets.

The present invention further relates to an infrared data communications system for use in a work environment to establish a network connection between a computing device and a network access point in connection with a network and with a telephony switch providing a telephony signal. The infrared data communication system includes a network infrared port associated with the network access point, a telephony conversion circuit associated with the network access point and in communication with the network infrared port for converting the telephony signal from the telephone switch into a telephony data signal for transmission to the computing device and for converting a voice data signal from the computing device for transmission to the telephone switch, a device infrared port associated with the computing device so that an infrared data link can be established between the network infrared port and the device infrared port in order to establish the connection between the computing device and the network, and a processor associated with the computing device for formatting data communications between the network and the computing device and the telephone switch and the computing device

DETAILED DESCRIPTION OF THE PREFERRED EMBODIMENTS

Figure 1:
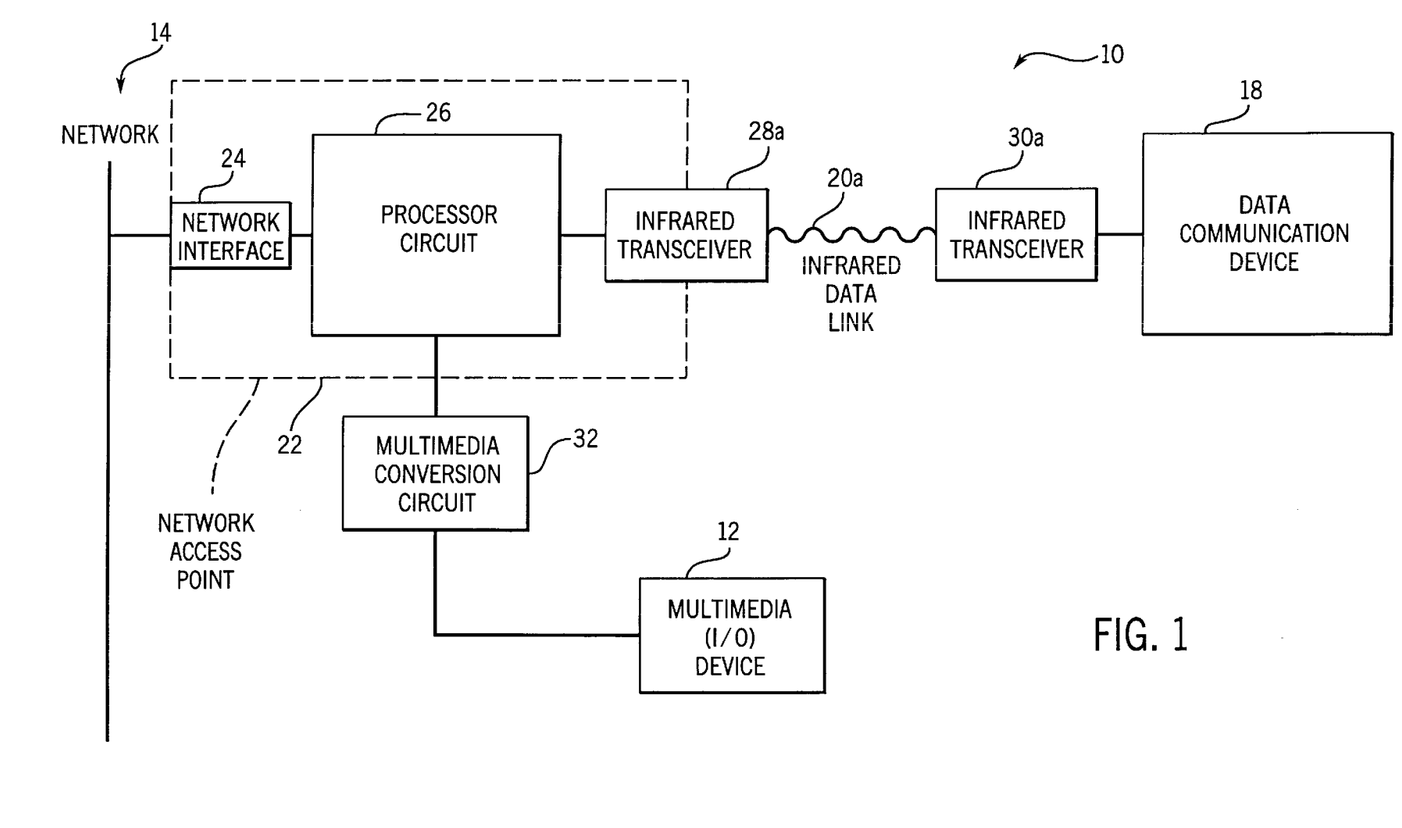
FIG. 1 is a schematic block diagram of a multimedia data communications system according to a preferred embodiment of the present invention.
Figure 1A:
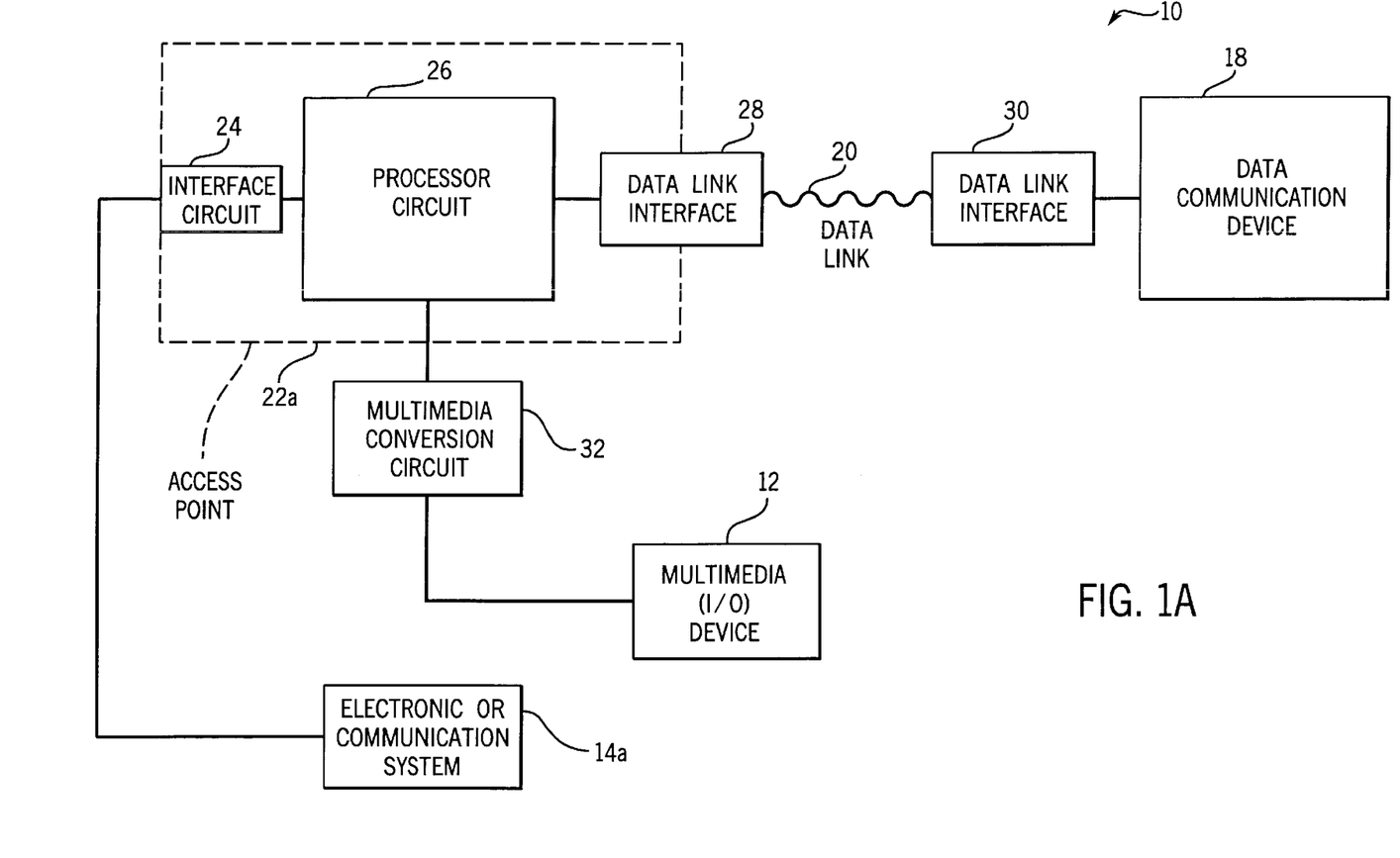
FIG. 1A is a schematic block diagram of the multimedia data communications system according to an alternative embodiment configured for general purpose application.

Referring to the FIGURES, a multimedia data communication system 10 for providing data communication between a multimedia system or device 12 and a data communication device 18 is shown. According to any preferred embodiment, data communication device 18 is representative of a wide variety of devices or systems capable of or supported by data communications, for example, any computer, computing device, personal digital assistant, electronic organizer, data bank, remote control, other type of communicator or communication device, pager or the like. According to a particularly preferred embodiment, data communication device 18 is also associated with one (or more) electronic or communication system 14a (as shown in FIG. 1A). According to a preferred embodiment shown in FIG. 1, the communication system (which can be any type of communication system, device, "Intelligent appliance" or the like capable of or supported by data communications) is shown as a computer network 14 (e.g. local area network (LAN) such as an Ethernet or the like as may typically include a network server 16 (as shown in (FIG. 5)). According to any preferred embodiment, such as shown in the FIGURES, multimedia data communications system 10 is used in a work environment (such as an office, laboratory, manufacturing facility or the like) to establish a connection between data communication device 18 and an access point 22a (also shown as a network access point 22) in connection with communication system 14a also shown as computer network 14 (and with multimedia device 12 providing a multimedia signal).

For purposes of the preferred and alternative embodiments of the present invention the term "multimedia" is intended to be used in the broadest possible manner to include audio, voice, telephony, video or any like signal or combination of signals; according to the preferred embodiments the multimedia signal will be an analog signal, although according to alternative embodiments, the multimedia signal could be a digital signal (e.g. as may be provided by a digital telephone network or other digital multimedia device). In the typical application of the data communication system according to any particularly preferred embodiment, the multimedia signal will be a signal representative of an "analog" or continuous quantity (e.g. an audio signal or conventional telephony signal) that is sampled at a specified rate or frequency and "digitized" into a multimedia data signal (e.g. in a digital format).

Data communication system 10 is configured to provide for a data link 20 (alternatively shown in the FIGURES as an infrared data link 20a) between data communication device 18 and computer network 14. Data communications from computer network 14 are provided through a network access point 22 (alternatively shown in the FIGURES as a general purpose access point 22a which can be installed in a worksurface, table or other article of furniture). (According to any alternative embodiment where the computer network is replaced or supplemented by a communication system of some other type, the access point will function in basically the same manner as the network access point.) Network access point 22 includes a network interface/controller 24 (a conventional circuit identifying the network access point to the computer network and enabling data communication with a computer network operating according to a specified protocol or proprietary format, e.g. as with an Ethernet) and a processor circuit 26 (which, among other things, generally provides the function of managing data communications between the computer network and the data communication device). As shown, infrared data link 20a is a line of sight wireless connection between an infrared transceiver 30a associated with data communication device 18 and an infrared transceiver 28a associated with network access point 22. According to a particularly preferred embodiment, data communications is established over infrared data link 28a in conformance with the standards of the Infrared Data Association (IrDA). According to alternative embodiments, the access point may be adapted as necessary for enabling communications with other communication systems, devices or the like. For example, as shown in FIG. 1A, data link 20 can be established between a port or data link interface 28 associated with access point 22a and a port or data link interface 30 associated with data communication device 18.

A multimedia conversion circuit 32 provides an interface between multimedia device 12 and access point 22a (e.g. network access point 22). According to any preferred embodiment, the function of the multimedia conversion circuit is to convert the multimedia signal from the type or format provided for output at the multimedia device to a type or format suitable for input to the access point and the data communication device (and, if required, to convert the output signal from the type or format provided for output at the access point and/or data communication device to the type or format suitable for input to the multimedia device). That is, the multimedia conversion circuit facilitates the transmission (e.g. input and output (I/O)) of signals between the multimedia device and the access point.

According to a particularly preferred embodiment, where the multimedia signal provided by multimedia device 12 is an analog signal, and a digital signal is required for I/O at processor circuit 26 of access point 22, multimedia conversion circuit 32 will include an analog-to-digital/digital-to-analog converter (e.g. an A/D–D/A converter) in the form of a device or circuit commonly referred to (and shown in the FIGURES) as a CODEC 34. As shown, CODEC 34 provides for the conversion of an analog multimedia signal into a digital multimedia data signal representative of the multimedia signal (and from a digital multimedia signal into an analog multimedia signal, if required for the particular application). (For telephone applications, it may be possible to use a lower cost CODEC such as is available from Texas Instruments, Motorola, AMD or other suppliers; for other multimedia applications, a higher quality CODEC, for example a stereo audio CODEC, such as available from Crystal Semiconductor, Analog Devices, or other suppliers.) According to any particularly preferred embodiment, CODEC 34 will sample the analog signal at a specified frequency and convert (i.e. "digitize") the analog signal into a digital signal having a specified resolution (i.e. "bits" of resolution or possible representative discrete signal levels) for the particular application. As will be recognized by those of skill in the art who review this disclosure, by selection of a suitable CODEC 34 (or other type of A/D converter) the frequency of sampling of the analog signal and the resolution of the digital signal can be selected or adjusted so as to strike a suitable balance between the quantity/volume of data and the quality of the signal in a given application.

Figure 6:
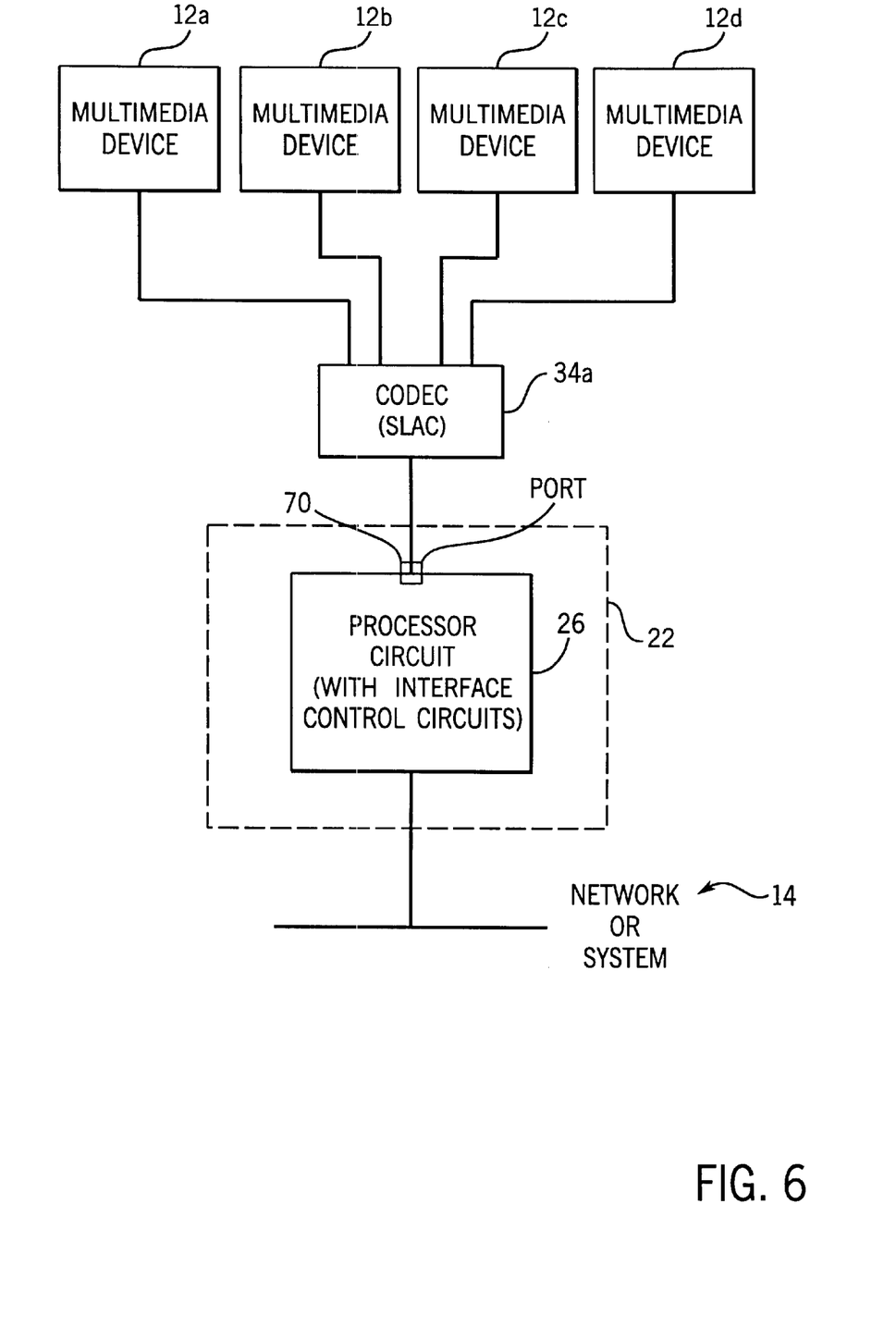
FIG. 6 is a schematic diagram of a access point and multimedia conversion circuit of a multimedia data communications system configured for a multi-channel application.

By converting the multimedia signal into a multimedia data signal, CODEC 34 enables data communications between multimedia conversion circuit 32 and processor circuit 26 of access point 22 and thereby data communications between multimedia device 12 and data communication device 18 and/or computer network 14 (i.e. any devices associated with the computer network). The multimedia device or system can be any system or device providing (and receiving) a multimedia signal in any format for any purpose, although typically in the form of an analog signal); according to alternative embodiments, a plurality of multimedia devices may be associated with the access point through or with the multimedia conversion circuit, for example as shown in FIG. 6. According to any particularly preferred embodiment, data communications between the multimedia device and the data communication device are facilitated (network data communications need not be enabled; a network connection need not be established for multimedia data communications). However, according to alternative embodiments, data communications between the computer network (or other communications system 14a) and the multimedia device can also be enabled through the access point.

According to a particularly preferred embodiment (see FIG. 4), multimedia conversion circuit 32 includes a digital signal processor (DSP) 36 for compressing or otherwise conditioning the digital multimedia data signal for high-speed transmission. (Alternatively, CODEC 34 may be connected directly to network access point 22, as shown in FIG. 6, depicting a CODEC 34a also capable of maintaining four channels of communication with four separate multimedia devices 12a through 12d.) Digital signal processor 36 (under the command of network access point 22) may perform such functions as data accumulating, formatting and compression. Alternatively, these functions may be performed (if at all) by the microprocessor associated with the processor circuit of the network access point. The digital signal processor in certain applications involving a larger volume of data flow will reduce the volume of data flow to the processor circuit of the network access point and thereby reduce the demand (i.e. processing "overhead" requirements) placed on the processor circuit. In other applications, e.g. those with lesser volume of data flow, it will not typically be necessary to include a digital signal processor.

Figure 4:
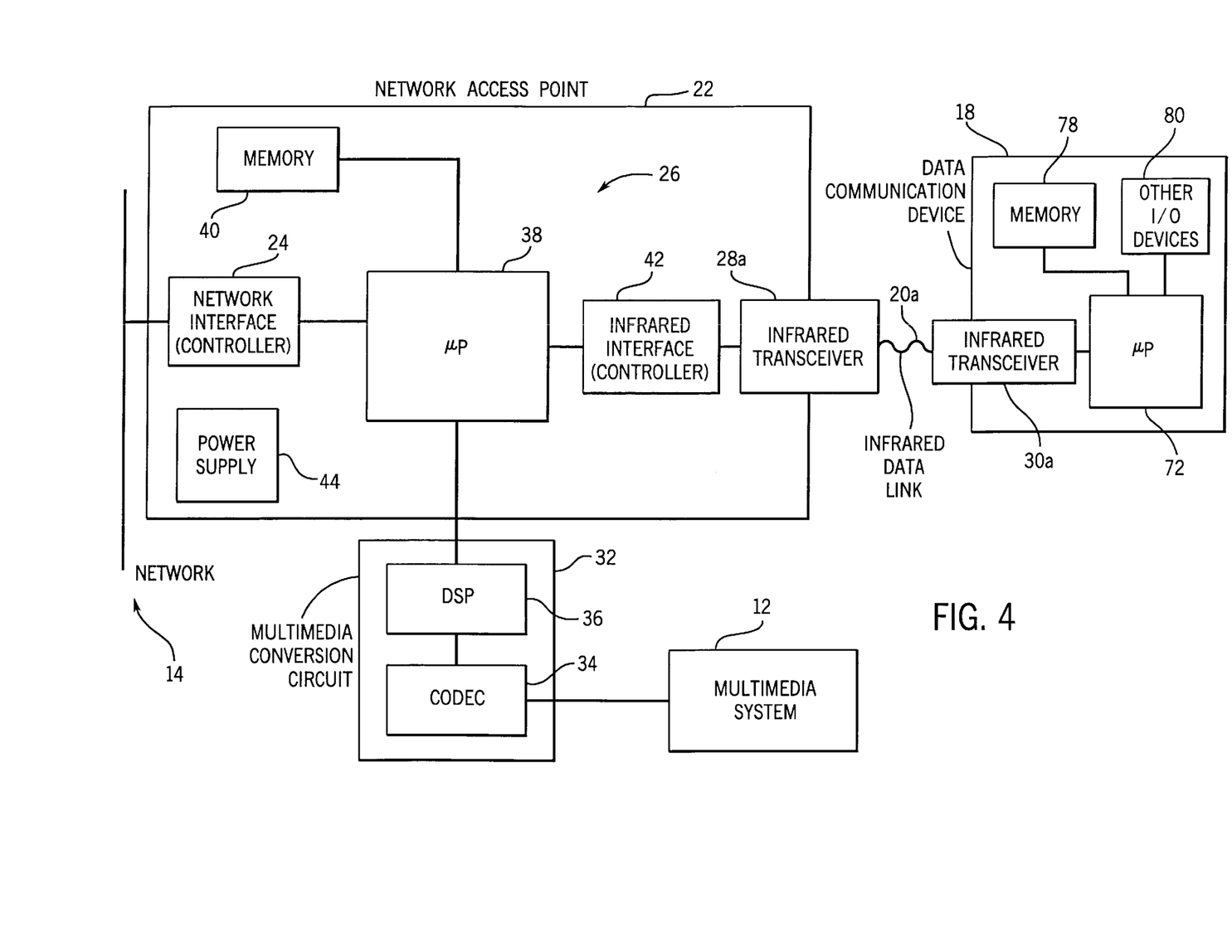
FIG. 4 is a schematic block diagram of the multimedia data communication system according to an alternative embodiment.

Network access point 22 according to a particularly preferred embodiment is shown in FIG. 4. Network access point 22 includes processor circuit 26 with a microprocessor 38, associated ROM/RAM memory 40, and typically I/O ports and other systems (not shown), configured with a control program for facilitating the data communications between either or both of computer network 14 (or other communication systems or devices 14a) and/or multimedia device 12 and data communication device 18 (e.g. computing device 18a). As shown in FIG. 4, network access point 22 includes a network port (shown as an infrared transceiver 28a) in communication with a device port (also shown as an infrared transceiver 30a) of data communication device 18 over a data link 20 (shown as an infrared data link 20a conforming to IrDA standards). As shown, the network port 28 is connected to microprocessor 38 through a data communications interface/controller circuit 42 (e.g. IrDA compliant interface); computer network 14 is connected to microprocessor 38 through a network interface/controller circuit 24 (e.g. Ethernet compliant interface). Multimedia conversion circuit 32 is connected to processor circuit 26 and to microprocessor 38 through an I/O port (e.g. a serial port of microprocessor 38). Network access point 22 may also include a separate power supply 44 and any other power and signal conditioning circuitry (not shown). (According to alternative embodiments where the access point is not necessarily connected to a computer network but instead to another type of communication system any interface circuit suitable for the communication system may be included in the access point.)

Figure 7:
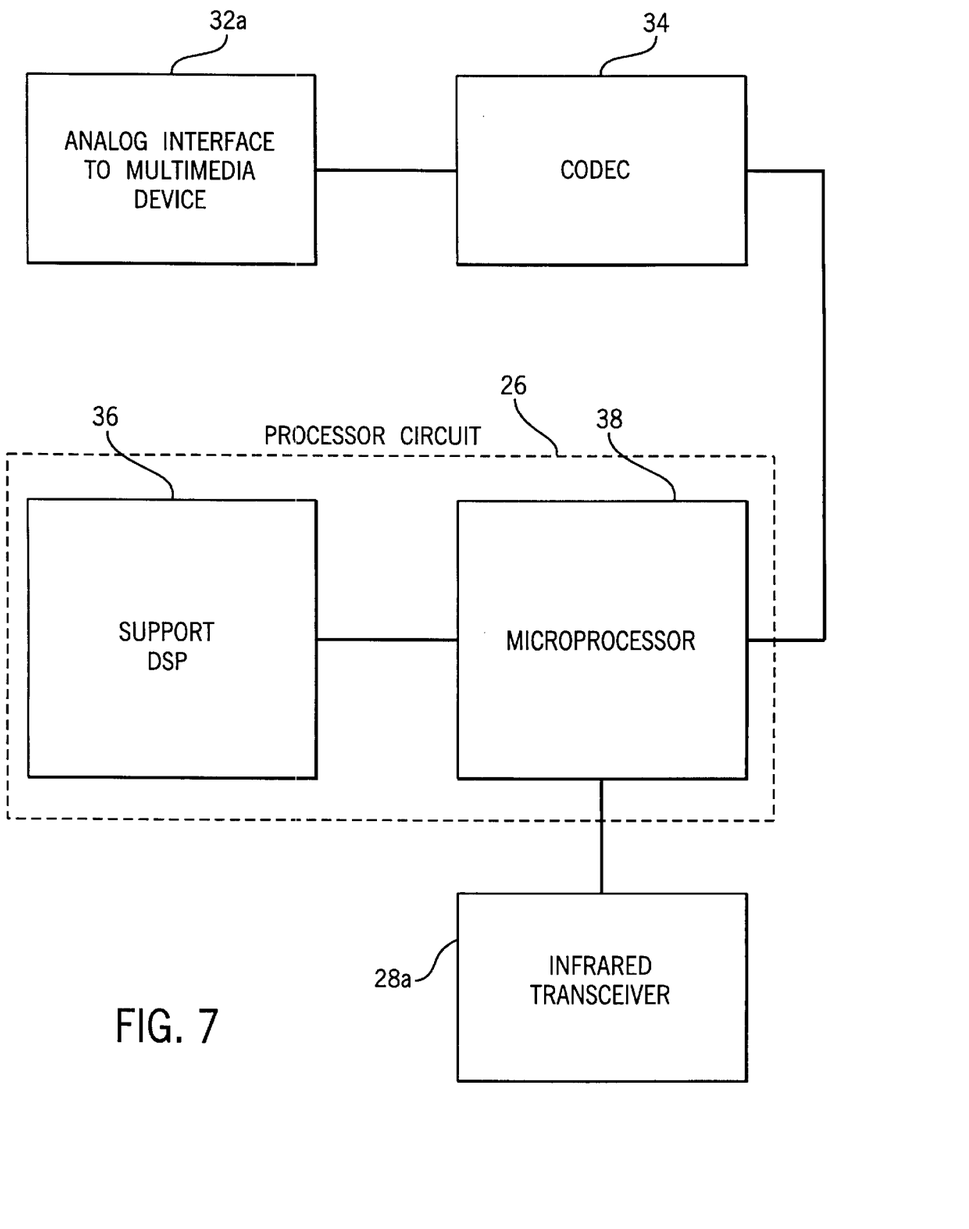
FIG. 7 is a schematic diagram of a access point of a multimedia data communications system according to an alternative embodiment.

As shown in FIG. 7, according to an alternative embodiment, digital signal processor 36 may be associated in direct support of microprocessor 38 as part of processor circuit 26 of network access point 22, with the multimedia data signal from multimedia device 12 being provided directly from CODEC 34.

According to any preferred embodiment, the network access point facilitates (e.g. formats and controls) data communication between the computer network and the data communications device. (By data communication is meant transmission of any data signal, e.g. data, commands or other information, typically in a digital format.) According to a particularly preferred embodiment, the data communications device is an IrDA-compliant device and the infrared data link (and data communications thereon) with the network access point will be established according to the IrDA standards; thus the processor circuit of the network access point and the data communications device will be configured to format and control data communications according to the IrDA protocol.

For example, according to a control program implemented by the processor circuit, the network access point will obtain data signals from the computer network (or other communication system), arrange and prepare the network data signals in the form of data packets (i.e. network data packets), for transmission (e.g. storing, buffering and/or queuing), and then transmit the network data packets to the data communication device. The network access point will also obtain multimedia data signals from the multimedia conversion circuit, arrange and prepare the multimedia data signals in the form of data packets (i.e. multimedia data packets) for transmission (e.g. storing, buffering and/or queuing), and then transmit the multimedia data packets to the data communication device. In addition, the network access point will obtain data signals directed to the computer network and/or the multimedia device from the data communication device in the form of device data packets, prepare the device data packets for transmission, and then transmit the device data packets to the computer network and/or the multimedia device. Thus the network access point implements (e.g. formats and controls) data communication between both the computer network and the multimedia device/multimedia conversion circuit and the data communications device (any of which may also be configured with a control program that provides for data communications according to the specified protocol). According to alternative embodiments, the data packets can be arranged or assembled at various locations and/or in a variety of formats. Protocols or standards for such data communications are generally known promulgated for example by the Institute of Electrical and Electronic Engineers (IEEE) or the Infrared Data Association (IrDA) (e.g. IEEE 802.3 or IrDA 1.1).

According to any particularly preferred embodiment however, the network data signals from the computer network (e.g. network data packets) will be sent over the data link "interlaced" with multimedia data signals from the multimedia conversion circuit (e.g. multimedia data packets) according to a priority scheme intended to allow for virtually "real time" I/O of the multimedia data signal at the data communication device. That is, the processor circuit of the network access point is configured to buffer, queue and transmit both network data packets and multimedia data packets in a manner that will give priority to the multimedia data signal over the network data signal for purposes of the transmission of the data communications with the data communication device.

According to a particularly preferred embodiment, the control program of the processor circuit of the network access point implements a method of transmitting a data signal having a multimedia component (e.g. multimedia data packets) and a data component (e.g. network data packets) in a serialized manner across the data link between the data communication device and the network access point. The multimedia signal will be sampled at the multimedia conversion circuit, converted into a multimedia data signal and assembled into multimedia data packets of a specified size. Each multimedia data packet is transmitted to the processor circuit of the network access point where it accumulates and is stored in a buffer and prepared for transmission to the data communication device. Network data packets are also being transmitted to the network access point where they accumulate and are stored in a buffer and prepared for transmission to the data communication device.

For example, in a voice or speech application, the multimedia signal may be continuously sampled as multimedia data at a designated sampling rate (e.g. one byte every 125 $\mu$sec) and transmitted to the processing circuit where it is accumulated as multimedia data in a buffer (i.e. a designated memory location). When a designated amount of multimedia data has accumulated (e.g. one Kbyte, which will be assembled every 125 msec) a multimedia data packet will be assembled and stored in a transmit list or queue (i.e. a designated memory location). Simultaneously, network data packets that have arrived at the processing circuit from the computer network will be assembled and stored in a transmit list or queue (i.e. a designated memory location). As multimedia data packets are assembled and stored in the transmit queue, they will be transmitted to the data communication device over the data link, regardless of whether any network data packets await transmission to the data communication device. Multimedia data packets are thereby given a priority over network data packets.

For example, the IrDA protocol provides for the multiple device connections or "channels" and therefore according to a particularly preferred embodiment, multimedia data packets may be "segregated" from network data packets (i.e. on separate channels or in separate transmit lists); for example, network data packets will be stored in a memory location or channel designated by the IrDA protocol as IRLAN (e.g. typically intended for transmission of network data); multimedia data packets may be stored in a separate memory location or channel the IrDA protocol designates as IRCOMM (e.g. typically intended for use as or by a serial port). According to a particularly preferred implementation under the IrDA protocol, each multimedia data packets placed on the IRCOMM channel will be transmitted over the IrDA data link in advance of any network data packet placed on the IRLAN channel that is also awaiting transmission over the IrDA data link.

If the IrDA data link is temporarily interrupted, multimedia data packets will accumulated in the IRCOMM channel until they can be transmitted. If the IrDA data link is dropped or lost, the buffers and channels that contained any data packets awaiting transmission will be cleared.

According to an alternative embodiment, a single transmit list (or queue) may include both multimedia data packets and network data packets; nevertheless, each multimedia data packet will be given priority for transmission over the data link. According to an alternative embodiment, multimedia data packets can be buffered and queued in a manner wherein the transmission is not effected until a specified number of multimedia data packets have been queued (e.g. two or more, instead of one), or so that other multimedia data packets accumulate while earlier multimedia data packets (one or more) are transmitted across the data link. According to a particularly preferred embodiment, suitable for speech or telephony applications, the data communication device will be configured (by a suitable control program) to assemble multimedia data packets that have been transmitted over the data link into essentially continuous data blocks (i.e. of at least two or more consecutive multimedia data packets) for playback. The size of the data packets as well as the specific rate arrangement and/or protocol for transmission can be adapted to fit the particular needs of the particular application.

Figure 2:
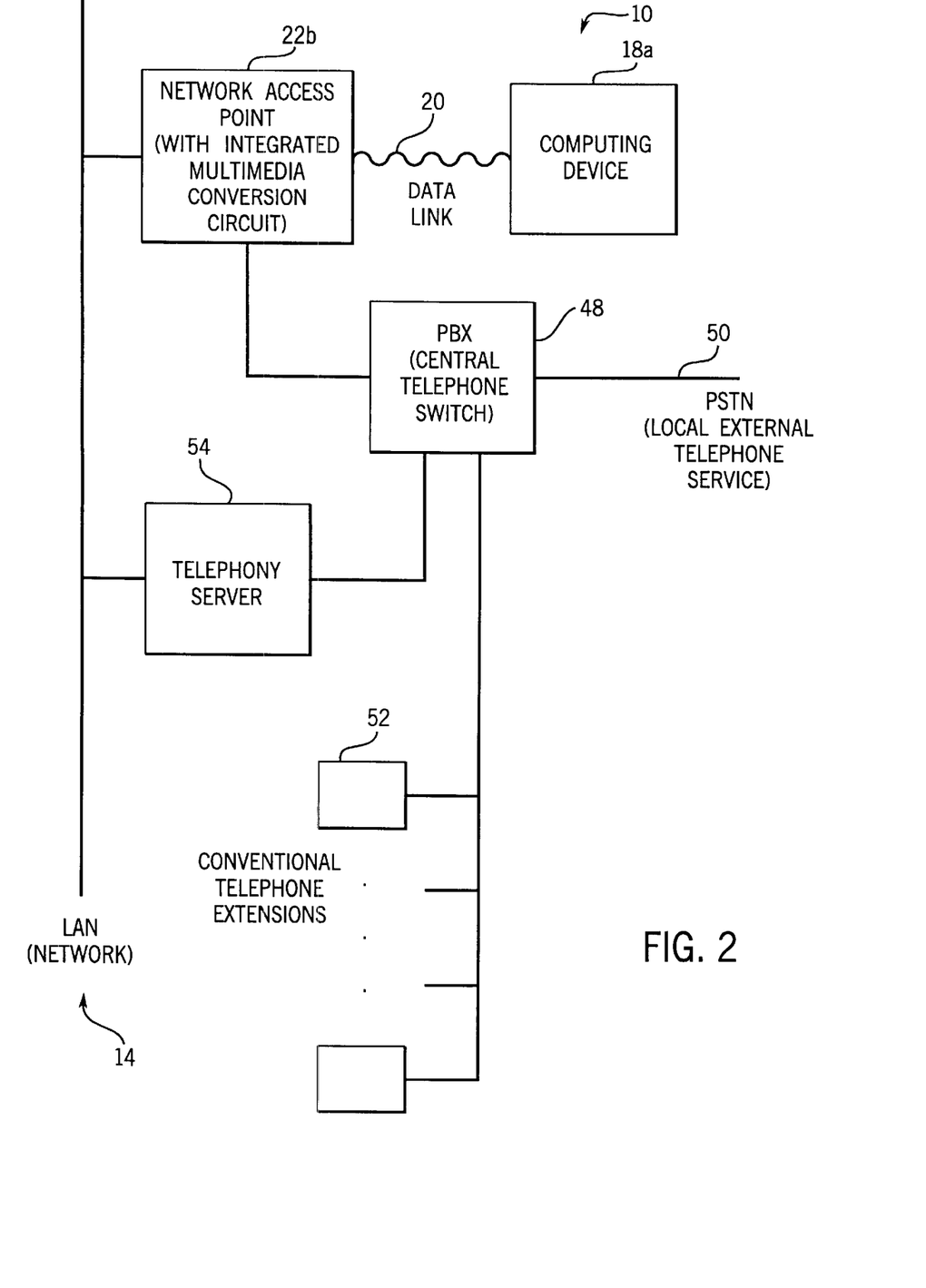
FIG. 2 is a schematic block diagram of a multimedia data communications system according to an alternative embodiment configured for a telephony application.

In a particularly preferred embodiment shown in FIG. 2, data communication system 10 is configured to provide for the communication of a telephony signal over a data link 20 between data communication device (shown as a computing device 18a) and network access point 22b containing an integrated multimedia conversion circuit in the form of a telephony conversion circuit (with CODEC not shown). The multimedia device is shown as a central telephone switch (i.e. PBX) 48 which in an office facility or other installation will receive external telephone service from a local external telephone network (Public Switched Telephone Network or "PSTN") 50 and route incoming and outgoing external telephone calls (from outside the facility) and/or internal calls (within the facility) to telephone extensions 52 or other telephony-enabled devices (such as a suitably configured data communications device). According to a preferred embodiment, the central telephone switch (PBX) 48 provides a conventional analog telephony signal from the outside telephone line (PSTN) 50. The facility may be any type of office, laboratory, factory or other work environment.

Central telephone switch 48 is also shown coupled to a telephony server 54 (i.e. a computing device suitably configured with a control program and a database according to any conventional or evolutionary arrangement) which will receive and route on computer network 14 (e.g. LAN) information about or associated with telephony service for the facility that is available from central telephone switch 48 (e.g. caller-ID, duration of call, line ready status, voice mail, etc.) or related system. According to any preferred embodiment, the telephone "network" including central telephone switch 48, telephony server 54 and telephone extensions 52 (as well as other associated hardware and software) may be of a conventional type. According to the exemplary embodiment, central telephone switch 48 provides an analog signal representative of a telephone call; however, according to alternative embodiments, the central telephone switch may be of a type that instead provides a digital signal representative of the telephone call.

Figure 3:
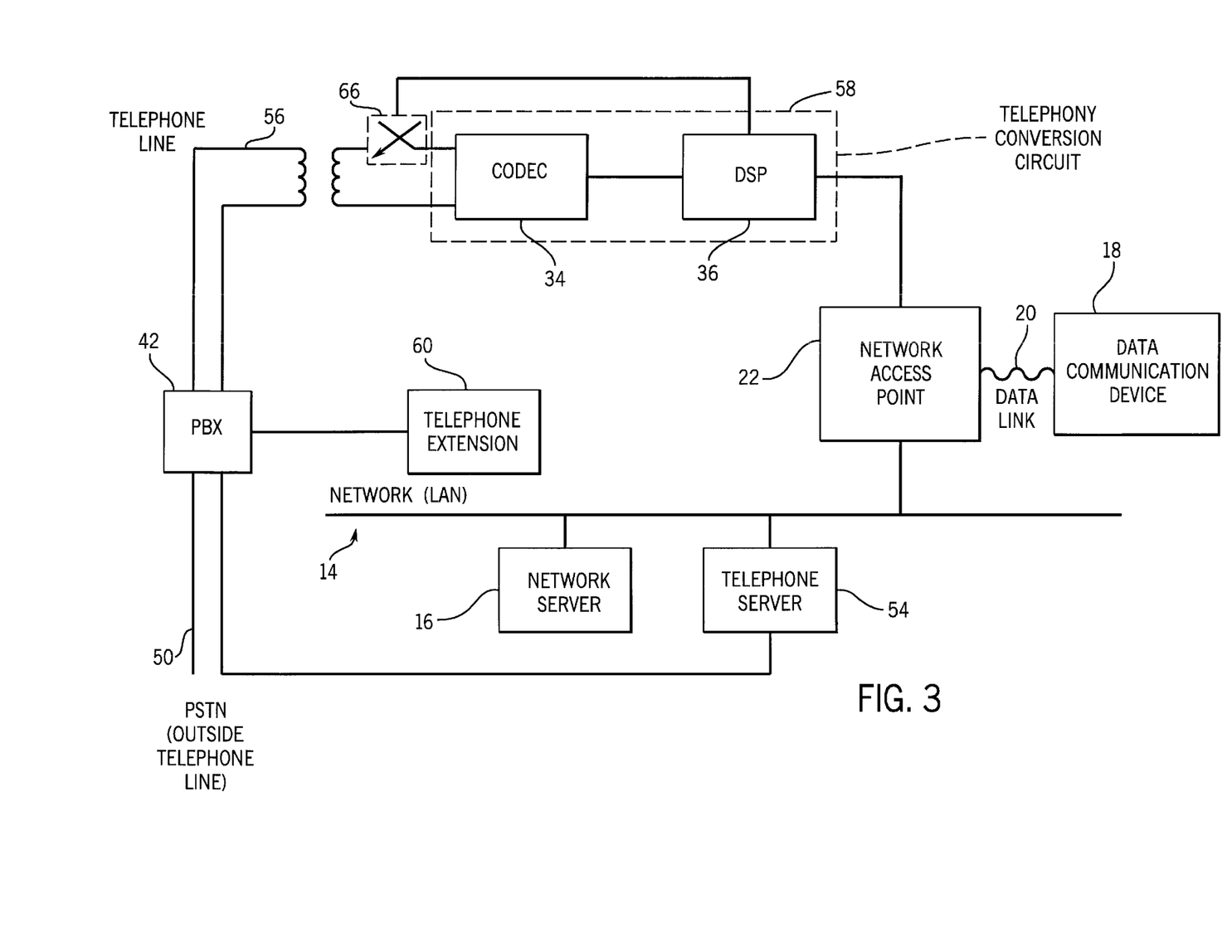
FIG. 3 is a schematic block diagram of the multimedia data communications system according to an alternative embodiment configured for a telephony application.

As shown in greater detail in FIG. 3, a telephony signal representative of a telephone call is provided over a telephone line 56 from central telephone switch (PBX) 48 to multimedia conversion circuit 32 (in this exemplary embodiment shown as a telephony conversion circuit 58 configured for analog telephony); included with telephony conversion circuit 58 is a CODEC 34 and a digital signal processor 36 (which is optional). Telephony conversion circuit 58 is connected to network access point 22. A telephony signal thus can be transmitted from central telephone switch 48 over telephone line 56 to telephony conversion circuit 58, to network access point 22 and to data communication device 18 over a data link 20. A telephony signal can also be transmitted from data communication device 18 over data link 20 to network access point 22 on to telephony conversion circuit 58 and to central telephone switch 48 over telephone line 56. (Central telephone switch 48 will route the telephone call to or from the intended destination or originator.) Internal telephone extensions 60 and/or additional telephony conversion circuits 58 may also be connected to the central telephone switch 48 for receipt and/or transmission of a telephone call.

Figure 3A:
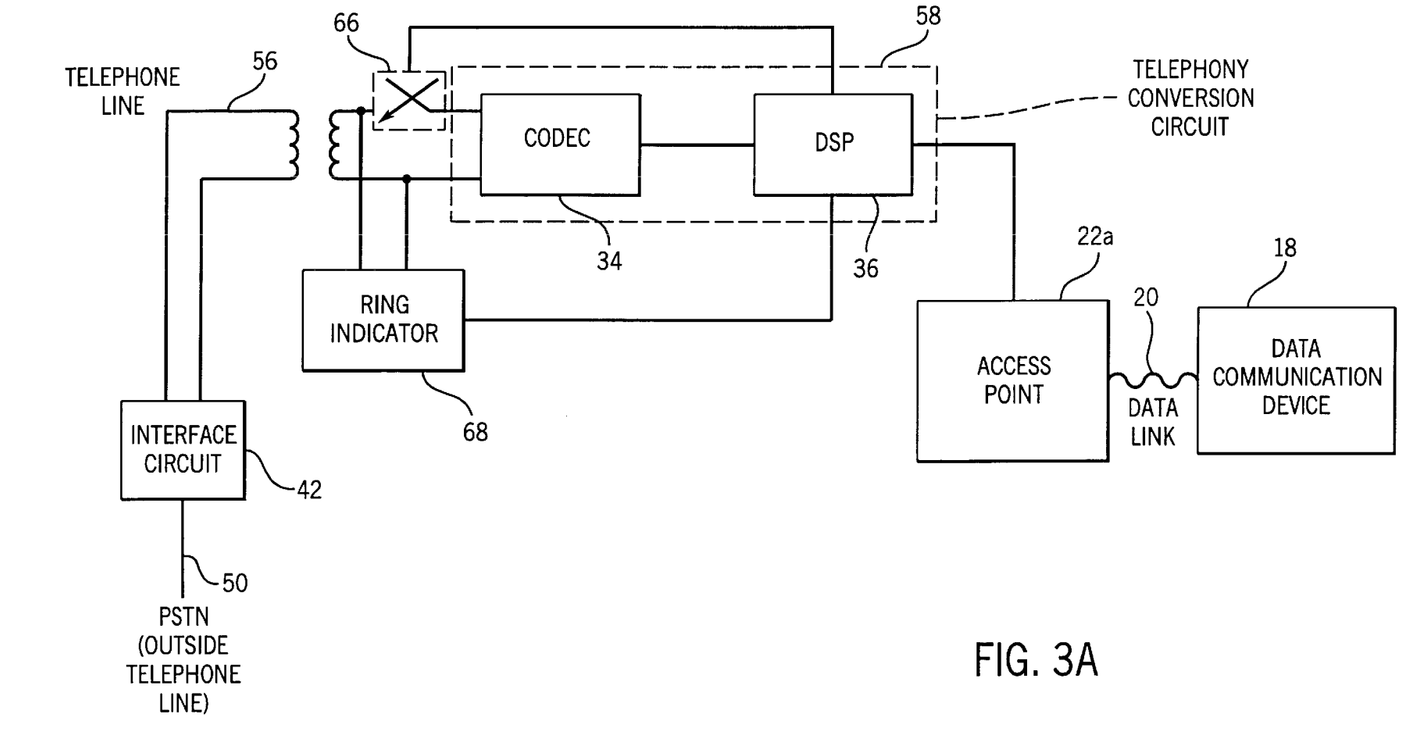
FIG. 3A is a schematic block diagram of the multimedia data communications system according to an alternative embodiment configured for a telephony application.

As shown in FIG. 3, central telephone switch 48 is connected to the external telephone network (PSTN) 50 and the internal telephone network for the facility or installation, which may include telephone extensions 60 and other telephony-enabled devices or systems and telephony server 54. Telephony server 54 is connected to computer network 14 (e.g. LAN) (as is the conventional network server 16 and other network devices and systems); network access point 22 connected to computer network 14 has access to data and information available from telephony server 54 (i.e. from the telephone network) and can transmit and/or receive data (including commands) to or from data communication device 18 once a data link has been established. As shown in FIG. 3A, according to an alternative embodiment capable of implementation where there is no central telephone switch, telephone line 56 can be provided directly from PSTN 50 through a suitable interface circuit 42; a ring indicator 68 may also be provided under the control of telephony conversion circuit 58 and/or data communication device 18. Data communication device 18 can be configured for full-featured telephony (e.g. as a computing device 18a with a speaker 62 and a microphone 64, see FIG. 5, display and control panel/user interface) so that a person (e.g. office worker) working at data communication device 18 will be able to conduct a telephone call over the data link.

As shown in FIGS. 3 and 3A, in order to enable telephony at data communication device 18 through telephony conversion circuit 58, telephony conversion circuit 58 is also provided with control over a "on-hook"/"off-hook" switch 66 for telephone line 56. According to a particularly preferred embodiment, shown in FIG. 3, upon receipt of an incoming telephone call, a ring indication can be given visibly or audibly at data communication device 18 from a signal generated by telephony server 54 (from central telephone switch 48) over computer network 14; alternatively or in addition, the ring indication can be given visibly or audibly at a telephone extension 60 near data communication device 18. Alternatively, as shown in FIG. 3A, telephony conversion circuit 58 can also be provided with a ring indicator signal from an external ring indicator 68 associated with the telephone line.

According to a particularly preferred embodiment, where computing device 18a is configured for full-feature telephony through network access point 22, when a call for a particular user or office worker associated with computing device 18a is received, telephony server 54 sends a notification to the user's personal computer via computer network 14 and network access point 22. If the user wishes to take the call, and enters an appropriate command through computing device 18a, telephony server 54 will direct the telephone call from the central telephone switch 48 to network access point 22 via the telephone conversion circuit 58. To initiate telephone communications, telephone line 56 is placed (i.e. commanded) "off-hook" (by closing switch 66) and the telephony signal is transmitted to telephony conversion circuit 58 from central telephone switch 48; CODEC 34 converts the telephony signal to a digital signal of a suitable format and transmits the digital signal to the digital signal processor 36 where it can be compressed or formatted for transmission to the network access point 22. (That is, the CODEC 34 converts an analog telephony signal from the PBX 48 into a digital signal for subsequent digital signal processing and transmission to computing device 18a and converts a digital signal from computing device 18a into an analog telephony signal for transmission to the PBX 48.) According to a particularly preferred embodiment (shown in FIG. 6), the digital signal processor 36 is not required and the digital signal from the CODEC (shown as having four separate I/O channels for four separate telephone lines and/or multimedia devices 12a through 12d) is provided directly to I/O port 70 of microprocessor 38 of processor circuit 26 of network access point 22 (which microprocessor may perform any digital signal processing functions such as data compression on an as-needed or as-desired basis). At the network access point the digital signal is assembled (along with any other data signals that may be provided from the computer network 14 to which the network access point 22 is also connected) into an appropriate format for transmission to the data communication device 18 over the data link 22.

According to any preferred embodiment, an audio signal representative of the telephony signal will be "heard" at a suitable output device (such as speaker 62, see FIG. 5) associated with the data communication device. Likewise a digital voice input signal representative of an analog voice input or other audio input provided at a suitable input device (such as microphone 64, see FIG. 5) associated with the data communication device is recorded and transmitted over the data link to the network access point, where it is "decoded" and transmitted in an appropriate format to the telephony conversion circuit (e.g. expanded, etc.). At the telephony conversion circuit the digital voice input signal (as subsequently formatted) is converted to an analog telephony signal by the CODEC and placed on the telephone line for transmission to the central telephone switch (and on to the intended destination).

Figure 5:
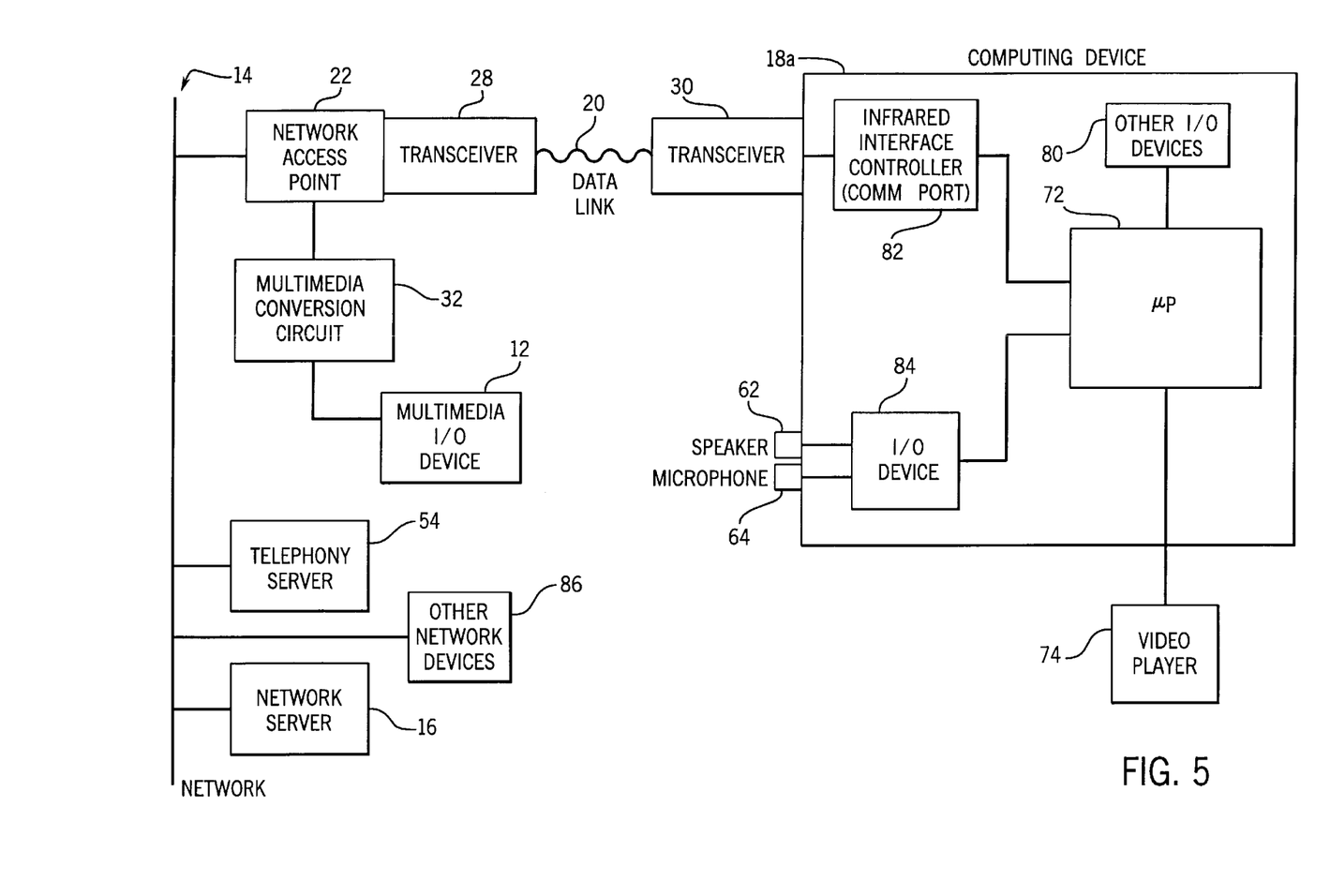
FIG. 5 is a schematic block diagram of the multimedia data communications system according to an alternative embodiment.

The data communication device may be any type of computing device or like device (such as computer or a PDA) configurable for the telephony function. According to a particularly preferred embodiment, the computing device is a portable computer (e.g. a "notebook" computer or "laptop" computer). According to a particularly preferred embodiment shown in FIG. 5, computing device 18a will include a microprocessor 72 provided with suitable software/hardware to perform both as a full-service telephone and as a multimedia player. As shown in FIG. 5, computing device 18a includes speaker 62 and microphone 64 (coupled to an I/O device 84 which receives and transmits signals from microprocessor 72) to play and record multimedia signals, as well as a video player 74 (a video recorder (not shown) may also be provided). Computing device 18a also includes memory (e.g. RAM/ROM) 78, an infrared interface controller 82 (including the function of a communication port) through which data signals directed to and from network access point 22 will be directed. Computing device 18a also includes other I/O devices (shown schematically with reference numeral 84). As shown in FIG. 5, computing device 18a is connected by data link 20 not only to computer network 14 (and network server 16, telephony server 54 and other associated devices and systems) but also to multimedia device 12 (which may be an analog or digital telephony switch, audio player/recorder, intercom, video player/recorder or the like) through network access point 22. An office worker associated with computing device 18a (or a similarly situated data communication device) is therefor able to communicate and share information available from both the computer network and the telephone network and/or other multimedia device. As is apparent to those of skill in the art who review this disclosure, a plurality of office workers may each be provided with a multimedia data communication system according to any of the exemplary embodiments within a given facility or work environment.

According to a particularly preferred embodiment, the data link between the network access point and the data communication device is established according to IrDA standards; thus data communications between the network access point and the data communications devices (i.e. IrDA-compliant device) will be provided according to a protocol set forth in the applicable IrDA standards. (The IrDA standards may be revised from time to time.) According to alternative embodiments, the data link may be any other type of link, such as any other type of wireless connection or a direct cable connection. According to a particularly preferred embodiment, for voice applications, the CODEC is a Motorola MC145554, the DSP is a Motorola DSP56002FC, and the microprocessor is an AMD AM186ED (general purpose 16-bit microprocessor); according to alterative embodiments, as will be recognized by those of skill in the art who review this disclosure, circuits, and/or systems can be implemented according to alternative embodiments that employ any of a wide variety of suitable components.

Although only a few exemplary embodiments of this invention have been described in detail above, those skilled in the art who review this disclosure will readily appreciate that many modifications are possible in the exemplary embodiments without materially departing from the novel teachings and advantages of the present invention.

As will be recognized by those who review this disclosure, the method and apparatus of the present invention may be implemented in a wide variety of alternative embodiments according to the basic teachings and suggestions provided herein. Accordingly, all such modifications are intended to be included within the scope of the invention as defined in the following claims. In the claims, each means-plus-function clause is intended to cover the structures described herein as performing the recited function and not only structural equivalents but also equivalent structures.

Other substitutions, modifications, changes and omissions may be made in the design, operating conditions and arrangement of the preferred embodiments without departing from the spirit of the invention as expressed in the appended claims.

What is claimed is:

1. A data communications system for use in a work environment to establish a connection between a data communication device and an access point in connection with a communication system and with a multimedia system providing a multimedia signal which comprises:

a data port associated with the access point;

a multimedia conversion circuit associated with the access point and in communication with the data port for converting the multimedia signal from the multimedia system into a first multimedia data signal for transmission to the data communication device and for converting a second multimedia data signal from the data communication device for transmission to the multimedia system;

a device port associated with the data communication device so that a data link can be established between the data port and the device port;

a processor associated with the access point for formatting data communications between both the communication system and the data communication system and the multimedia device and the data communication device for transmission over the data link;

wherein the multimedia system includes a telephone switch and further comprises a telephony server coupled to the telephone switch and to the access point via the communication system so that when a telephone call is directed to a telephone extension associated with the data communication device the telephony server sends a notification to the data communication device via the access point through the data link and when the telephone call is answered at the data communication device the telephone switch sends the multimedia signal to the data communication device via the access point through the data link.

2. The data communications system of claim 1 wherein the data communication device is a computing device.

3. The data communications system of claim 1 wherein the data port is a network port and the communication system is a computer network.

4. The data communications system of claim 1 wherein the data link is an infrared data link.

5. The data communications system of claim 3 wherein the multimedia system includes a telephone switch and further comprises a telephony server coupled to the telephone switch and to the access point via the computer network so that when a telephone call is directed to a telephone extension associated with the data communication device the telephony server sends a notification to the computing device via the access point through the data link and when the telephone call is answered at the data communication device the telephone switch sends the multimedia signal to the data communication device via the access point through the data link.

6. The data communications system of claim 1 wherein the multimedia conversion circuit further comprises a CODEC.

7. The data communications system of claim 1 wherein the multimedia conversion circuit further comprises a digital signal processor.

8. The data communications system of claim 2 wherein the computing device is configured to function as a full-feature telephone.

9. The data communication system of claim 1 wherein the multimedia system includes an audio player.

10. The data communication system of claim 1 wherein the telephony server is a computing device.

11. The data communication system of claim 1 wherein the telephony server is configured with a control program and a database.

12. The data communication system of claim 3 wherein the telephony server is coupled to the computer network.

13. The data communication system of claim 12 wherein the telephony server is configured to receive and route on the computer network.

14. The data communication system of claim 3 wherein the telephony server is configured to provide data to the computer network.

15. The data communication system of claim 1 wherein the notification is a signal generated by the telephony server.

16. A data communications system for use in a work environment to establish a network connection between a data communication device and a network access point in connection with a network and with a multimedia device providing a multimedia signal which comprises:

a network port associated with the network access point;

a multimedia conversion circuit associated with the network access point and in communication with the network port for converting the multimedia signal from the multimedia device into a first multimedia data signal for transmission to the data communication device and for converting a second multimedia data signal from the data communication device for transmission to the telephone switch;

a device port associated with the data communication device so that a data link can be established between the network port and the device port in order to establish the connection between the data communication device and the network;

a processor associated with the network access point for formatting data communications between the network and the data communication device and the multimedia device and the computing device according to a communications protocol;

wherein the multimedia device includes a telephone switch and further comprising a telephony server coupled to the telephone switch and to the network access point via the network so that when a telephone call is directed to a telephone extension associated with the data communication device the multimedia server sends a notification to the data communication device via the network access point through the data link and when the telephone call is answered at the data communication device the telephone switch sends the multimedia signal to the data communication device via the network access point through the data link.

17. The data communications system of claim 16 wherein the data communication device is a computing device configured to perform as a multimedia player.

18. The data communications system of claim 16 wherein the network port is installed within an article of furniture.

19. The data communications system of claim 16 wherein the data link is an infrared data link.

20. The data communications system of claim 16 wherein the communication protocol is a standard protocol for the communication of infrared data.

21. The data communications system of claim 20 wherein the communication protocol is a standard promulgated by the Infrared Data Association.

22. The data communications system of claim 16 wherein the multimedia device include a telephone switch and further comprising a telephony server coupled to the telephone switch and to the network access point via the network so that when a telephone call is directed to a telephone extension associated with the computing device the multimedia server sends a notification to the computing device via the network access point through the data link and when the telephone call is answered at the computing device the telephone switch sends the multimedia signal to the computing device via the network access point through the data link.

23. The data communications system of claim 16 wherein the multimedia conversion circuit further comprises a digital signal processor.

24. The data communications system of claim 16 wherein the multimedia conversion circuit further comprises a CODEC.

25. The data communication system of claim 16 wherein the telephony server is a computing device.

26. The data communication system of claim 16 wherein the telephony server is configured with a control program and a database.

27. The data communication system of claim 16 wherein the telephony server is coupled to the network.

28. The data communication system of claim 27 wherein the telephony server is configured to receive and route on the network.

29. The data communication system of claim 16 wherein the telephony server is configured to provide data to the network.

30. The data communication system of claim 16 wherein the notification is a signal generated by the telephony server.

31. An infrared data communications system for use in a work environment to establish a network connection between a computing device and a network access point in connection with a network and with a telephone switch providing a telephony signal which comprises:

a network infrared port associated with the network access point;

a telephony conversion circuit associated with the network access point and in communication with the network infrared port for converting the telephony signal from the telephone switch into a telephony data signal for transmission to the computing device and for converting a voice data signal from the computing device for transmission to the telephone switch;

a device infrared port associated with the computing device so that an infrared data link can be established between the network infrared port and the device infrared port in order to establish the connection between the computing device and the network;

a processor associated with the computing device for formatting data communications between the network and the computing device and the telephone switch and the computing device;

a telephony server coupled to the telephone switch and to the network access point via the network so that when a telephone call is directed to a telephone extension associated with the computing device the telephony server sends a notification to the computing device via the network access point through the infrared data link and when the telephone call is answered at the computing device the telephone switch sends the telephony signal to the computing device via the network access point through the infrared data link.

32. The infrared data communications system of claim 31 wherein network infrared port is associated with an article of furniture.

33. The infrared communications system of claim 31 wherein the telephony conversion circuit further comprises a CODEC.

34. The infrared communications system of claim 33 wherein the telephony conversion circuit further comprises a digital signal processor.

35. The infrared communications system of claim 34 wherein the telephony device is a full-feature telephone.

36. The data communication system of claim 31 wherein the telephony server is a computing device.

37. The data communication system of claim 31 wherein the telephony server is configured with a control program and a database.

38. The data communication system of claim 31 wherein the telephony server is coupled to the network.

39. The data communication system of claim 38 wherein the telephony server is configured to receive and route on the network.

40. The data communication system of claim 31 wherein the telephony server is configured to provide data to the network.

41. The data communication system of claim 31 wherein the notification is a signal generated by the telephony server.

* * * * *